(12) United States Patent
Nguyen

(10) Patent No.: US 12,301,166 B1
(45) Date of Patent: May 13, 2025

(54) PLANT-SHAPED SOLAR ENERGY COLLECTOR

(71) Applicant: Thach Trong Nguyen, West Delray Beach, FL (US)

(72) Inventor: Thach Trong Nguyen, West Delray Beach, FL (US)

(*) Notice: Subject to any disclaimer, the term of this patent is extended or adjusted under 35 U.S.C. 154(b) by 0 days.

(21) Appl. No.: 18/591,807

(22) Filed: Feb. 29, 2024

(51) Int. Cl.
*H02S 30/10* (2014.01)
*A41G 1/00* (2006.01)
*H02J 7/35* (2006.01)
*H02S 10/40* (2014.01)
*H02S 20/10* (2014.01)
*H02S 20/30* (2014.01)
*H02S 40/34* (2014.01)

(52) U.S. Cl.
CPC .............. *H02S 30/10* (2014.12); *A41G 1/001* (2013.01); *A41G 1/007* (2013.01); *H02J 7/35* (2013.01); *H02S 10/40* (2014.12); *H02S 20/10* (2014.12); *H02S 20/30* (2014.12); *H02S 40/34* (2014.12); *H02J 2207/20* (2020.01)

(58) Field of Classification Search
None
See application file for complete search history.

(56) References Cited

U.S. PATENT DOCUMENTS

| 8,740,423 B1 * | 6/2014 | Jackson | .................... F21S 8/00 362/253 |
| 11,088,653 B1 | 8/2021 | Gupta | |
| 2005/0045224 A1 * | 3/2005 | Lyden | ........................ H02J 7/35 136/252 |
| 2013/0240024 A1 | 9/2013 | Kim | |
| 2022/0069765 A1 * | 3/2022 | Paulus | ..................... A62C 3/16 |

FOREIGN PATENT DOCUMENTS

| CN | 209291918 U | * | 8/2019 | .............. B66F 11/04 |
| CN | 220417193 U | * | 1/2024 | .............. F21V 15/00 |
| JP | 11168228 A | * | 6/1999 | .............. Y02E 10/50 |

OTHER PUBLICATIONS

Machine translation—JPH11168228A (Year: 1999).*
Machine translation—CN 220417193 (Year: 2024).*
Machine translation—CN 209291918 (Year: 2019).*
Adam Zewe, Paper-thin solar cell can turn any surface into a power source, Dec. 9, 2022, MIT News, Massachusetts Institute, Massachusetts.

* cited by examiner

*Primary Examiner* — Tamir Ayad
(74) *Attorney, Agent, or Firm* — Sanchelima & Associates, P.A.; Christian Sanchelima; Jesus Sanchelima

(57) ABSTRACT

A plant-shaped solar energy collector including a tree assembly and a solar cell assembly. The tree assembly includes a plurality of trunk members, a plurality of branch members, and a plurality of twig members. Each trunk member of the plurality of trunk members are electrically and removably connected one to each other. The plurality of branch members are electrically and removably connected to the plurality of trunk members. The plurality of twig members are electrically and removably connected to said plurality of branch members. The plurality of leaf members has solar cells embedded therein. The plurality of leaf members are removably connected to the plurality of twig members.

9 Claims, 8 Drawing Sheets

PLANT-SHAPED SOLAR ENERGY COLLECTOR

BACKGROUND OF THE INVENTION

1. Field of the Invention

The present invention relates to solar panels and, more particularly, to solar panel arrays having a visual and physical similarity to plants such as but not limited trees, especially with respect to having a 3D-branched solar panel configuration compared to conventional 2D planar solar array configurations.

2. Description of the Related Art

Several designs for arrangement of stationary mountings or supports for solar heat collector modules extending in directions away from a supporting surface have been designed in the past. None of them, however, include a plant-shaped solar energy collector having a tree-like structure with solar cells located on the twigs of the structure. The solar cells have the shape of leaves.

Flat panel solar cells were invented about 70 years ago and have become a vital part for solar energy collection systems. However, the flat panel solar cells are rigid, heavy and bulky. Therefore, the solar energy collecting method with the flat panel solar cell as basic, fundamental building unit is mainly two dimensional or area-based. Therefore, in order to obtain a larger power output, a larger area is required. The usage of flat panel solar cell energy collecting system is not suitable in urban residential areas, wherever the space is very confined or limited. Furthermore, the look of flat solar panels is not visually pleasing or altogether environmentally friendly, so not welcomed by most people.

In 2022, the department of Organic and Nano Structured Electronics of the Massachusetts Institute of Technology (MIT) "develop a scalable fabrication technique to produce ultrathin, lightweight solar cells that can be seamlessly added to any surface. [ . . . ] Because they are so thin and lightweight, these solar cells can be laminated onto many different surfaces. For instance, they could be integrated onto the sails of a boat to provide power while at sea, adhered onto tents and tarps that are deployed in disaster recovery operations, or applied onto the wings of drones to extend their flying range. This lightweight solar technology can be easily integrated into built environments with minimal installation needs." (MIT News Office, Dec. 9, 2022). With this new technology, the solar cell can be fabricated in the form of the plant leaves. Thereby enabling the concept of silent energy solar tree with volume-based solar energy collecting system.

Applicant believes that a related reference corresponds to U.S. Pat. No. 11,088,653 issued for a Solar energy collector having a tree structure. The "653" reference discloses systems and methods of a solar light and thermal energy collector assembly. The system includes a central pole mounted vertically on a base, a support structure having concentric racks extending radially from the central pole, the racks positioned at different vertical distances along the central pole and having a configuration that supports the solar panels, wherein each rack does not impede the passage of air and light through the rack, at least one solar panel affixed to each rack, each solar panel including a curved reflector formed at the radial edge of the solar panel, an airflow turbine disposed at the top of the central pole, the central pole having one or more apertures and ducts to direct heated air toward the airflow turbine; and electrical conductors for supplying electricity derived from photovoltaic cells in each solar panel and from the electricity-generating turbine.

Applicant believes that another related reference corresponds to U.S. publication No. 2013/0240024 published for a Tree-shaped solar cell module. The aforementioned reference teaches a tree-shaped solar cell module that includes branch modules and a trunk module which are assembled with each other into the tree-shaped solar cell module. Each branch of the tree-shaped solar cell module has high strength to be prevented from being shaken with wind, and each branch does not have twigs or leaves and is thus prevented from being shaken by wind. Each branch may have a circular or polygonal shape such as a triangular shape or a quadrangular shape so that sunlight may evenly come to the tree-shaped solar cell module. Like branches of a tree which are directed upwardly, downwardly or horizontally, the branch modules may be assembled in such a manner that the branch modules have angles in a horizontal, upward or downward direction from the trunk module.

The above cited references filed on 2019 Aug. 16 and 2011 Dec. 2, correspondingly, fail to disclose the volume-based plant-shaped solar energy collector, wherein the cells are leaf shaped and are modularly attached to the body of the system. Moreover, the cells are made of the ultrathin, lightweight solar cells. Namely because the cited references cannot teach of what is claimed in the appended claims as by the time the references were filed, the technology disclosed herein did not exist.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a more effective and natural-looking alternative to conventional rooftop solar energy systems.

It is another object of this invention to provide an enhanced visual appearance and which is capable of harvesting more solar energy.

It is still another object of the present invention, wherein the individual solar collection "leaves" would be removably connected for structural conduit branches that would route the solar collector wiring into the body/trunk of the system.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
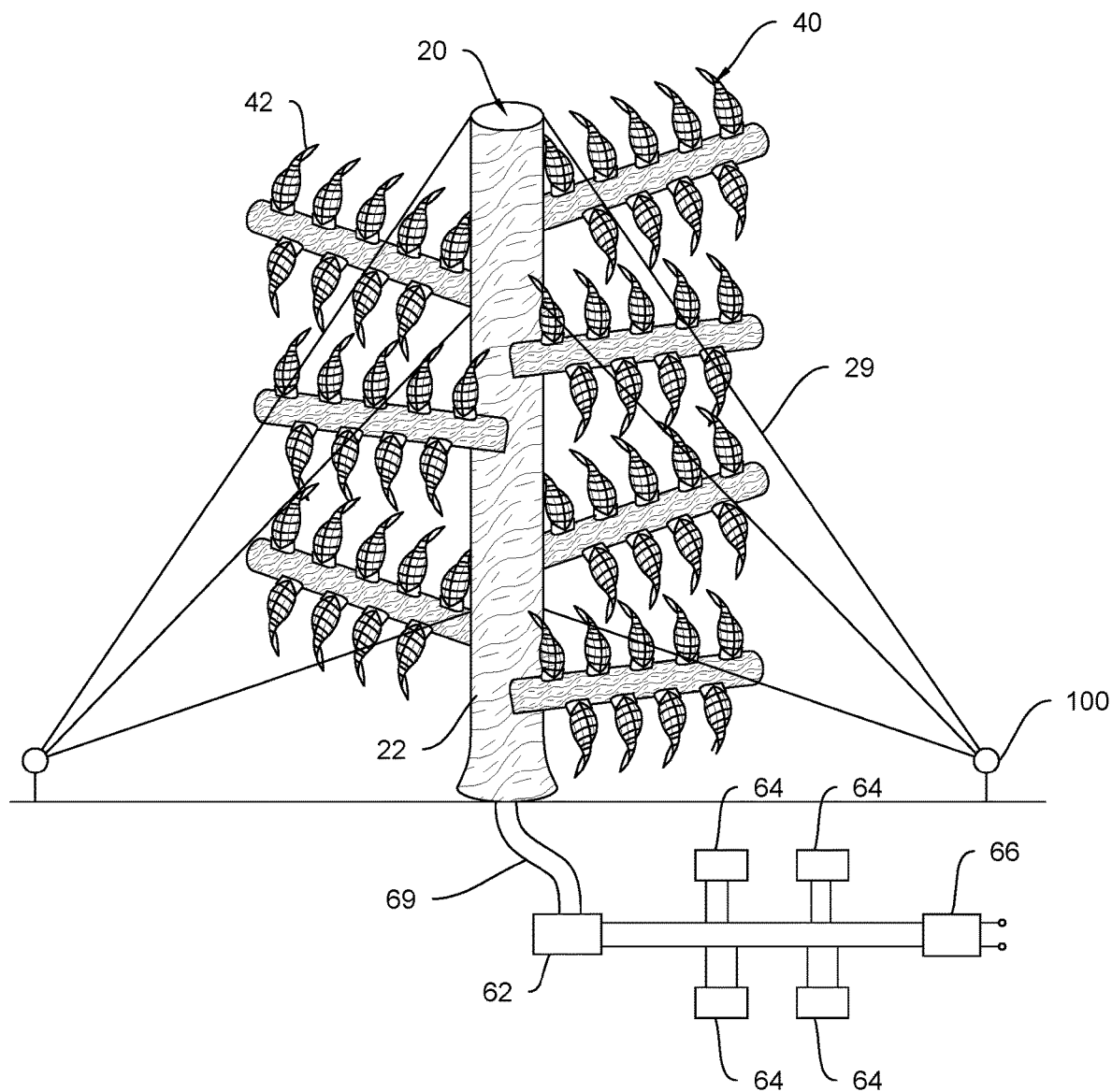
FIG. 1 represents an isometric operational view of one of the preferred embodiments of the present invention 10.
Figure 2:
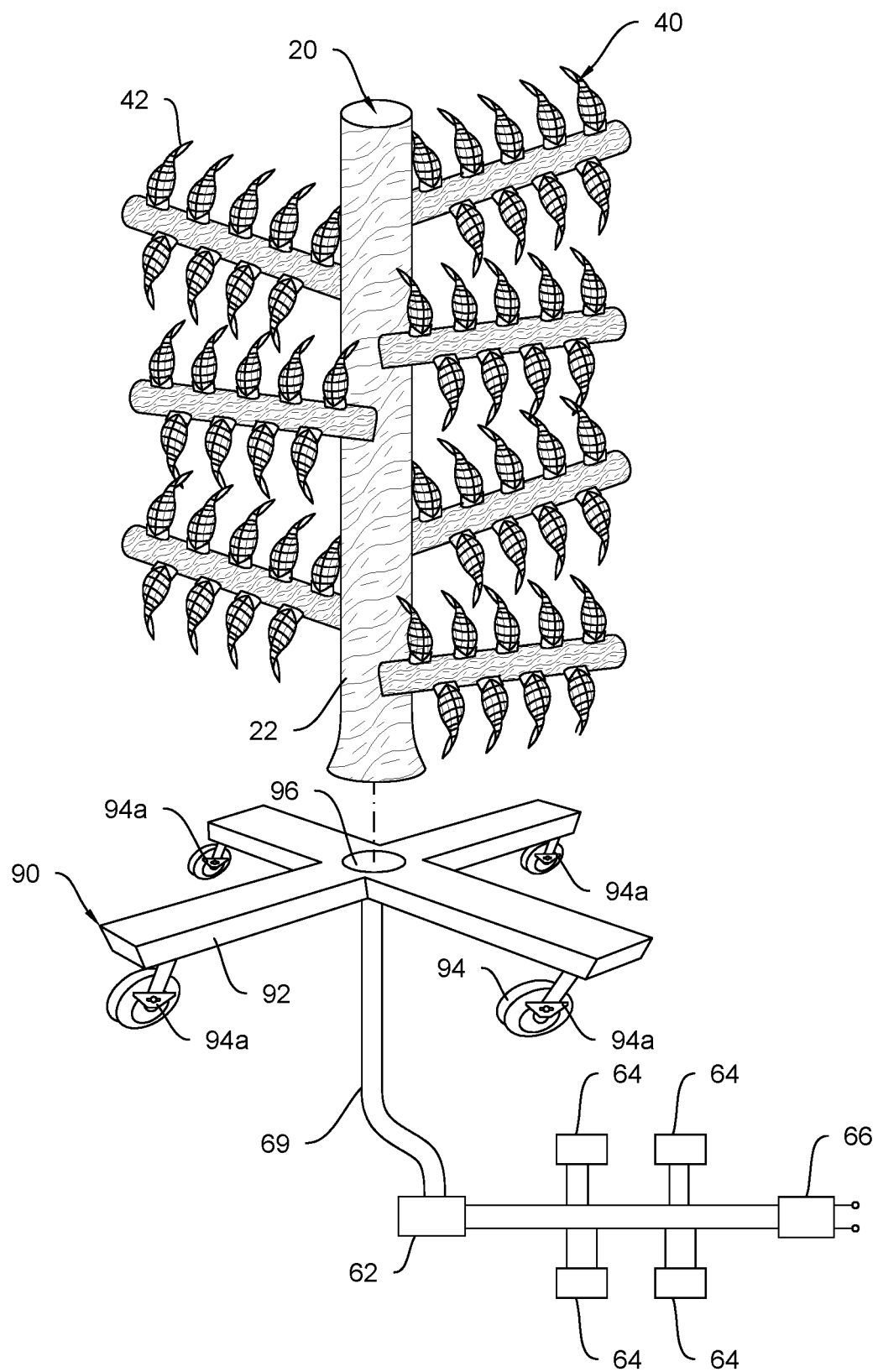
FIG. 2 shows a front view of one embodiment of the present invention showing the casters assembly 90 attached to the tree assembly 20.
Figure 3:
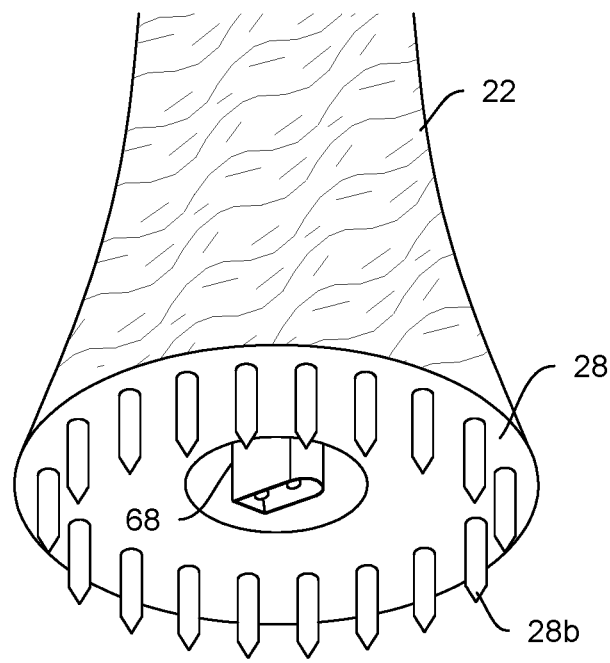
FIG. 3 illustrates an enlarged view of a tree base 28 depicting a plurality of spikes 28b protruding from a bottom surface of the tree base 28.
Figure 4:
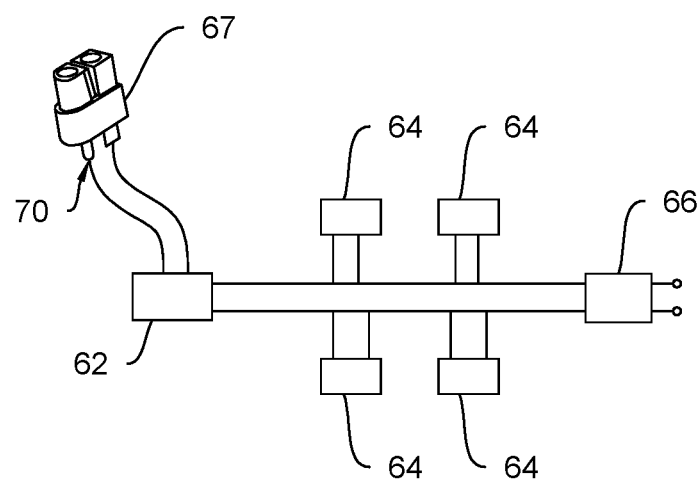
FIG. 4 is a representation of an enlarged view of the electric assembly 60 showing the charger controller 62 electrically connected to batteries 64 and to an inverter 66.
Figure 5:
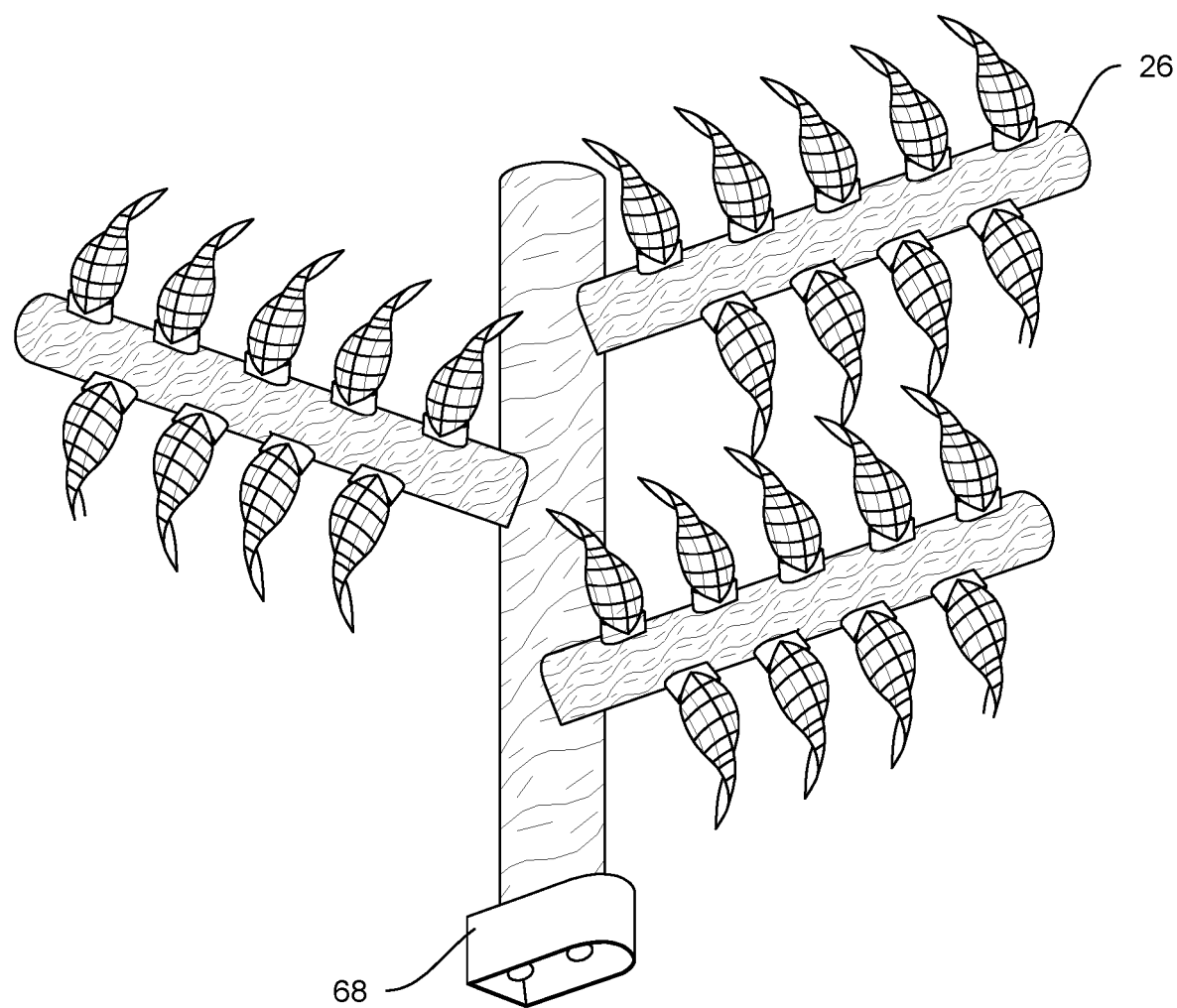
FIG. 5 depicts an enlarged view of a plurality of twig members 26 being connected to one branch member of the plurality of branch members 24.
Figure 6:
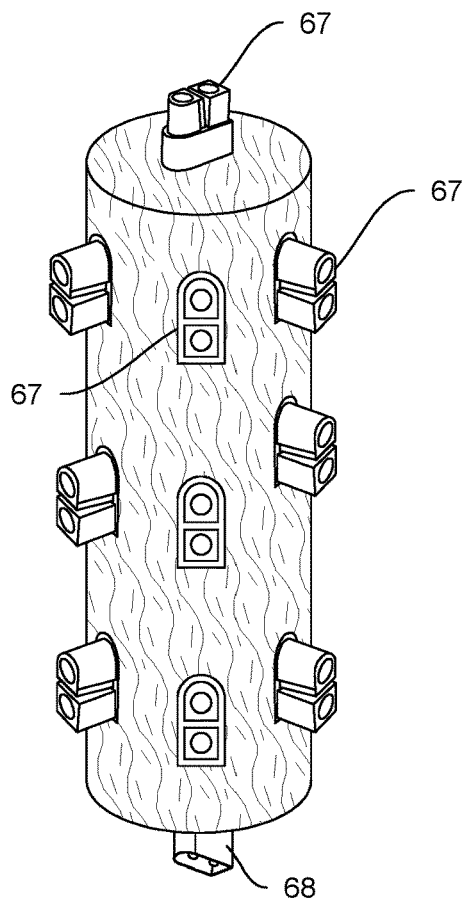
FIG. 6 shows an enlarged view of one trunk member of the plurality of trunk members 22 having a socket 68 and plugs 67 disposed thereon.
Figure 7:
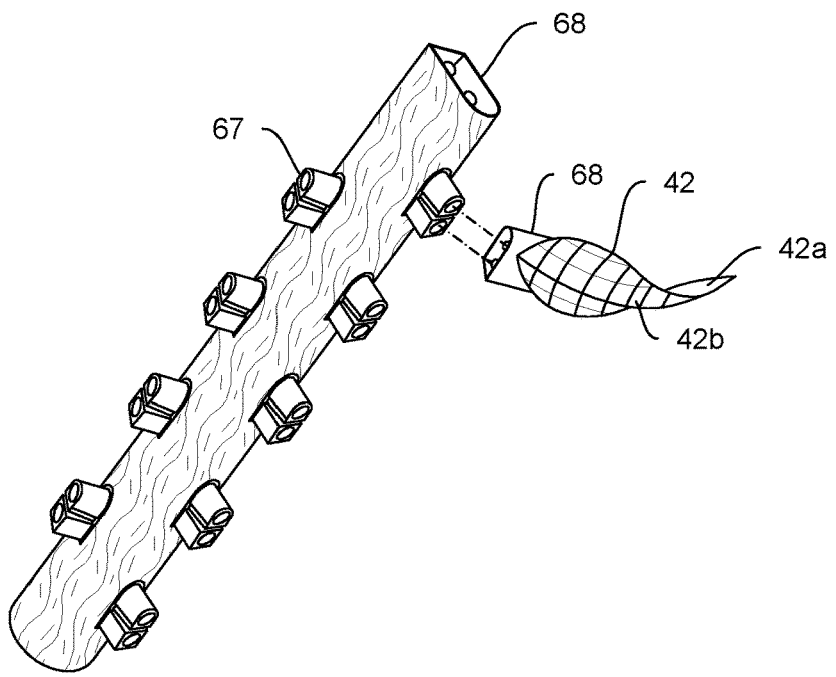
FIG. 7 is an enlarged view of one twig member of the plurality of twig members 26. A plug 67 of the twig member of the plurality of twig members 26 is receiving a socket 68 of one leaf member of the plurality of leaf members 42.
Figure 8:
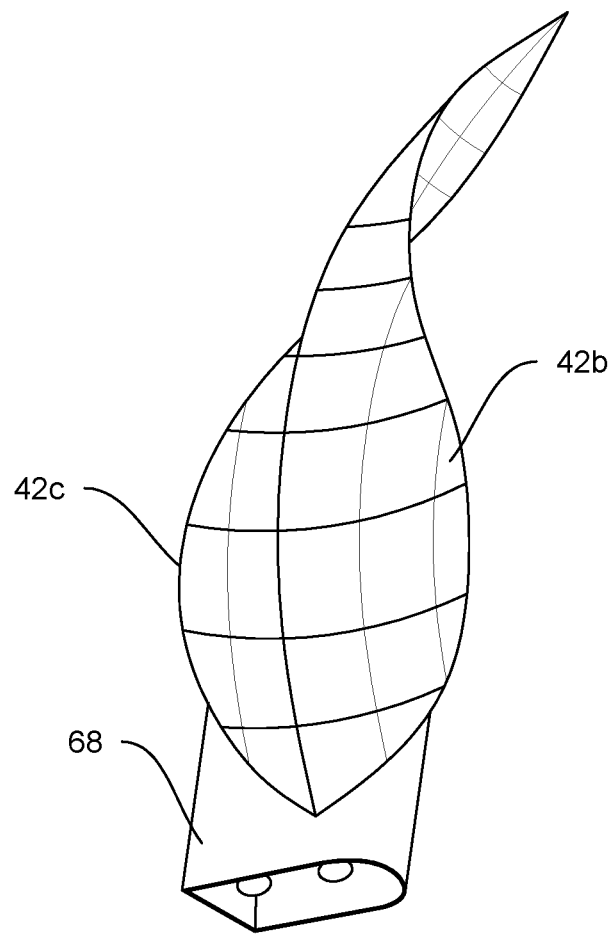
FIG. 8 is an enlarged view of a rear isometric view of one leaf member of the plurality of leaf members 42 showing the solar panel 42b embedded on a rear side 42c. The leaf member is a double sided leaf.

Referring now to the drawings, where the present invention is generally referred to with numeral 10, it can be observed that it basically includes a tree assembly 20, a solar cell assembly 40, and an electric assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

In one embodiment, the tree assembly 20 may include a plurality of trunk members 22, a plurality of branch members 24, a plurality of twig members 26, and a base 28. Each trunk member of the plurality of trunk members 22 may have an elongated cylindrical shape. It also may be suitable to have a plurality of trunk members 22 with a tree-like shape for pleasing the users. The plurality of trunk members 22 may have an outer surface having a texture similar to a tree bark. It should be understood that other shapes may also be suitable for the plurality of trunk members 22. The plurality of trunk members 22 may be hollow. The plurality of trunk members 22 may be made of a plastic or any other suitable material with good strength to support the weight of the plurality of branch members 24 and the plurality of twig members 26.

A first distal end of each of the plurality of trunk members 22 may have a plug 67 attached therein. A second distal end of each of the plurality of trunk members 22 may have a socket 68 mounted therein. The plug 67 may be an electric plug. The socket 68 may be an electric socket. The plug 67 of a first trunk member of the plurality of trunk members 22 may cooperate with the socket 68 of a second trunk member of the plurality of trunk members 22 to stack multiple trunk members of the plurality of trunk members 22 according to the desired height configuration of the present invention 10.

Each trunk member of the plurality of trunk members 22 may further include plugs 67 disposed along a length thereof. Each trunk of the plurality of trunk members 22 may include plugs 67 around a perimeter thereof.

The plurality of branch members 24 may have an elongated cylindrical shape. It also may be suitable to have the plurality of branch members 24 with other suitable shapes for a tree branch. The plurality of branch members 24 may be hollow. The plurality of branch members 24 may be made of a plastic or any other suitable material with a strength to support weight. The plurality of branch members 24 may have an outer surface having a texture similar to a tree bark. A first distal end of each branch of the plurality of branch members 24 may have plug 67 mounted therein. A second distal end of each branch of the plurality of branch members 24 may have one of socket 68 mounted therein.

The socket 68 of a first branch of the plurality of branch members 24 may be connected to one of the plugs 67 disposed on the perimeter of the one trunk member of the plurality of trunk members 22. The plug 67 of a distal end of a second branch of the plurality of branch members 24 may cooperate with the socket 68 of a third branch of the plurality of branch members 24 to stack multiple branches of the plurality of branch members 24 according to a desired width configuration of the present invention 10. Each branch of the plurality of branch members 24 may have plugs 67 disposed around a surface thereof.

Each twig of the plurality of twig members 26 may have a cylindrical shape or any other suitable shape for a tree twig. The plurality of twig members 26 may be made of a plastic or any other suitable material with a strength to support weight. The plurality of twig members 26 may be hollow. A first distal end of each twig of the plurality of twig members 26 may have the plug 67 mounted therein. A second distal end of each twig of the plurality of twig members 26 may have the socket 68 mounted therein. The socket 68 of a distal end of a first twig of the plurality of twig members 24 may be connected to one plug 67 of the surface of a first branch member of the plurality of branch members 24. The socket 68 of a second twig member of the plurality of twig members 26 may cooperate with the plug 67 of a third twig member of the plurality of twig members 26 to stack multiple branch members of the plurality of branch members 24 according to a desired width configuration of the present invention 10. Each twig member of the plurality of twig members 26 may have plugs 67 disposed around a surface thereof.

The tree assembly 20 may further include a tree base 28 to be attached to the first distal end of one of the trunk members of the plurality of trunk members 24. In one embodiment, the tree base 28 may have a conic shape with a bottom portion wider than a top portion. Other embodiments of the tree assembly 20 may include a base with other suitable shapes. The tree base 28 may include a plurality of spikes 28b to secure the tree assembly 20 to the ground. The plurality of spikes 28b may be disposed on a surface of the bottom portion of the tree base 28. The tree assembly 20 may further include cables 29 to secure and provide additional support to the tree assembly 20. The cables 29 may be removably tensed and secured the plurality of trunk members to anchors 100 on the ground.

The present invention 10 may further include a casters assembly 90. The casters assembly 90 may include a frame 92. The frame 92 may have a shape of a cross frame with two beams having a center perpendicular attached. It also may be suitable to have a frame 92 with other shapes. Distal ends of the beams of the frame 92 may include wheels 94 attached thereto. Preferably the wheels 94 may be wheels with a locking mechanism 94a to allow locking the wheels and the position of the casters assembly 90. In other embodiments, the wheels 94 may be screw-in type wheels, plate type wheels, with shock absorber wheels, or any other kind of wheel suitable for casters. The center of the frame 92 may have a hole 96 to receive a trunk member 22 of the plurality of trunk members 22 therein. The casters assembly 90 may provide mobility to the tree assembly 20 to place the tree assembly 20 on the place with more solar light.

The solar cell assembly 40 includes a plurality of leaf members 42 having a front side 42a and a rear side 42c. The plurality of leaf members 42 may have a shape of any suitable shape of a tree leaf. In one embodiment, the front side 42a and the rear side 42c may have a solar panel 42b disposed thereon defining a double sided solar cell leaf. In other embodiments, the only one side of the leaf may have the solar panel 42b embedded therein defining a single sided solar cell leaf. Preferably, the solar panel 42b may be made of fabric like ultrathin, lightweight solar cells that can be added to any surface. Thereby the plurality of leaf members 42 may look like real tree leaves.

Each leaf member of the plurality of leaf members 42 may have one of the sockets 68 The solar panel 42 may be electrically connected to the plug 67 of each leaf member of the plurality of leaf members. The solar panel 42 may provide electric energy in the form of direct current electricity. The plugs 67 of the plurality of twig members 26 may be electrically connected to the socket 68 of each leaf member of the plurality of leaf members 42. It also may be suitable to include a solar tracking mechanism that allows the plurality of leaf members to track the sun to maximize the solar energy captured by the solar panels 42b. The solar tracking mechanism may be any suitable mechanism known in the art that tracks the path of the sun. In other embodiments, the solar cell assembly 40 may further include solar cells in the form and shape of fruits or flowers for the pleasant of a user. The solar cell assembly 40 may be designed with a different color, a different shape or a different size of a leaf, flower, or fruit of a plant. The solar cell assembly 40 may be provided in different colors, sizes, and shapes mimicking the existing fruits, leaves, and flowers of known plants such as trees.

Figure 9:
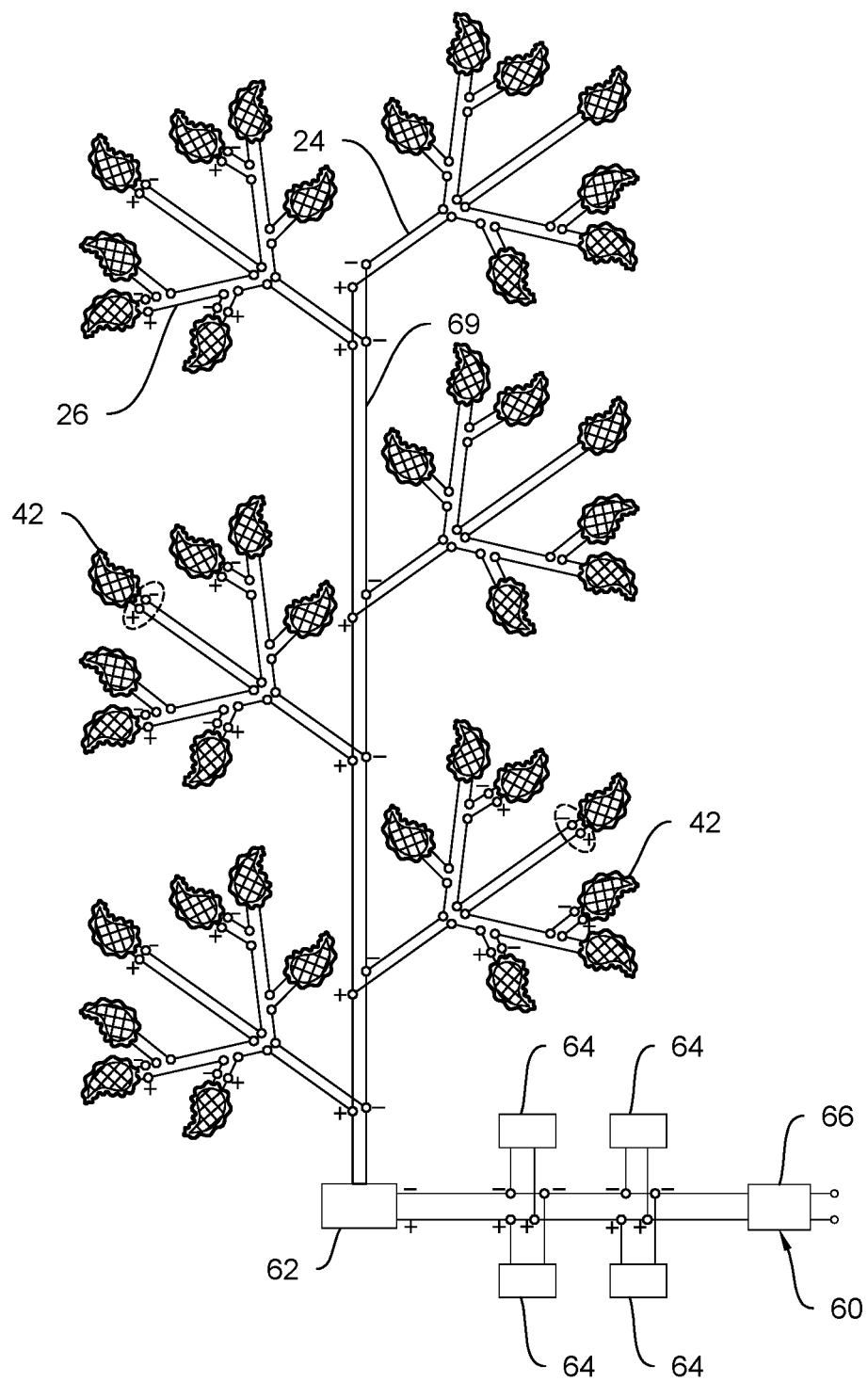
FIG. 9 represents an electric diagram of one of the preferred configurations of the electric assembly 60.
Figure 10:
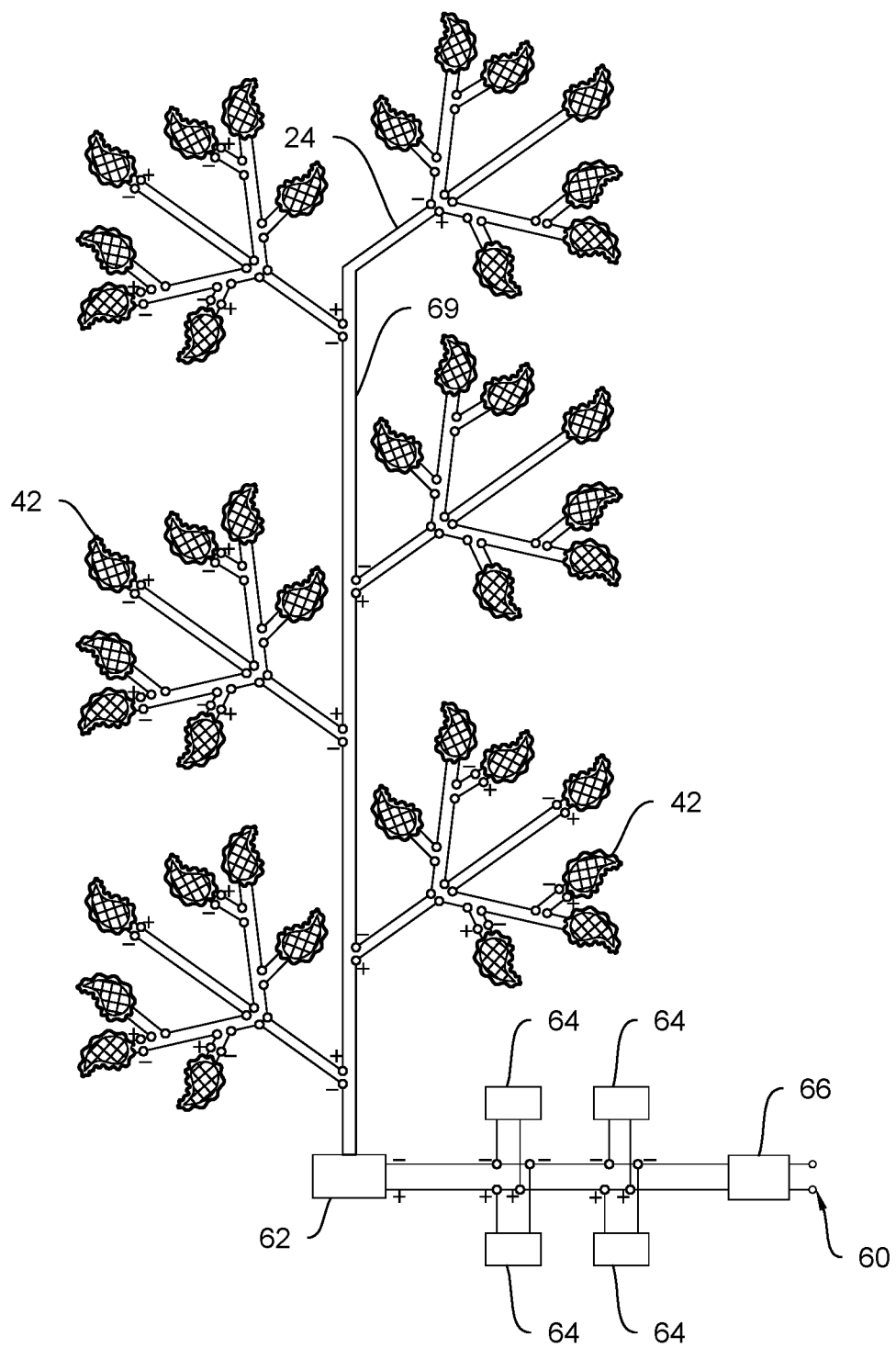
FIG. 10 represents an electric diagram of an alternative configuration of the electric assembly 60.

The electric assembly 60 may include a charger controller 62, batteries 64, an inverter 66 and wiring 69. The wiring 68 may electrically connect the plugs 67 and sockets 68 of each of the plurality of trunk members 22, plurality of branch members 24, and plurality of twig members 26. The electric connections between plugs 67 and sockets 68 may be in series or in parallel. The wiring 69 may allow to circulate electric energy provided by the solar panels 42b along the different elements of the tree assembly 20. In FIG. 9 and FIG. 10 can be observed the connections in series or in parallel of the electric assembly 60 and the solar cell assembly 40. The connection in series connects poles with different polarity between elements. The connection in parallel connects poles with equal polarity between elements. The connection in series allows to sum the voltage of the elements connected in series. The connection in parallel allows to sum the currents of the elements connected in parallel.

The charger controller 62 may be electrically connected to the wiring 69 receiving the electric energy generated from the solar cell assembly 40. The charger controller 62 may regulate the electric energy provided by the solar cell assembly 40 into a direct electric current appropriate for the batteries 64. The batteries 64 may store the electric energy generated by the solar cell assembly 40. The inverter 66 may transform the direct electric current provided by the charger controller and the batteries 64 into alternating electric current of conventional values for the use in homes or other buildings.

It should be noted that the tree assembly 20 may be modular and configured to a desired height and width to maximize the conversion of solar energy into electrical energy. The tree assembly 20 may be configured to have a shape of a tree having the solar cell assembly 40 to mimic the leaves of a tree. The solar cell assembly 40 may be disposed on the plurality of twig members 26 allowing to cover a wider area to receive solar sunlight. The casters assembly 90 may allow the tree assembly to easily be moved to different zones. The 3D disposition of the leaves of the tree may enable the solar energy collector system described herein to be a very efficient and effective system to transform the solar energy into electrical energy to the desired power output. The tree assembly 20 may be selectively configured to have a typical height of 5 ft, 10 ft, or 20 ft. Nonetheless, it also may be suitable to have the tree assembly 20 with a height of 30 ft, 40 ft, 50 ft, or any other desired height. The base 28 may be provided as a construction foundation base to provide the needed support to the tree assembly 20 for the large configuration. The cables 29 may provide the stability required to the tree assembly 20. Alternatively, other structural supports known in the prior art may be used to provide additional support and stability to the tree assembly 20.

It should be understood that the plant-shaped solar energy collector refers to the concept of a 3D solar energy collecting system with a look preferably but not limited to a plant such as a tree or any other type of plant known. It also may be suitable to have the structure of the plant-shaped solar energy collector with the solar cells and other structural elements with a no-plant look like, but with a variation in size, shape, and color and with the volumetric 3D structure for an enhanced solar energy collection. It should be understood that the terms referred to parts of a plant or tree such as but not limited to leaf, branch, trunk, and twig are herein named as such to denote that the structural members of the tree assembly intent to mimic the look of the elements of a real plant or tree. However, the aforementioned structural members are not intended to be parts of a real tree.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A plant-shaped solar energy collector, comprising:
a) a tree assembly including a plurality of trunk members, a plurality of branch members, and a plurality of twig members, wherein trunk members of the plurality of trunk members are electrically and removably connected to each other, said plurality of branch members are electrically and removably connected to the plurality of trunk members, said plurality of twig members are electrically and removably connected to said plurality of branch members, wherein the plurality of trunk members have plugs disposed around a surface thereof, said plurality of branch members include plugs disposed around a surface thereon, wherein each of the plurality of branch members includes a first socket to modularly connect to one of the plugs of the plurality of trunk members, wherein each of the plurality of twigs includes a second socket to modularly connect to one of the plugs of the branch members, wherein the tree assembly further includes a base having a bottom surface with a plurality of spikes, said plurality of spikes are disposed on the bottom surface of the base, wherein said bottom surface has a third socket, wherein said tree assembly further includes cables to provide support to the tree assembly, said cables are removably secured to the plurality of trunk members and to anchors located on a ground surface, wherein the tree assembly is modular and capable of being configured to a desired width and height;

b) a solar cell assembly including a plurality of leaf members, each leaf member of the plurality of leaf members having a solar cell embedded therein, said plurality of leaf members are removably connected to said plurality of twig members, wherein each leaf member of the plurality of leaf members has a fourth socket to be connected to one of the plugs of the plurality of trunk members;

c) an electric assembly including a charger controller and batteries, wherein the charger controller is electrically connected to the solar cell assembly receiving electric energy from each solar cell of a respective leaf member of the plurality of leaf members, wherein the charger controller charges the batteries, wherein said electric assembly further includes an inverter to transform a direct electrical current provided by the solar cell assembly into alternating electrical current; and d) a caster assembly including a frame, said frame is attached to a tree bottom portion of one of the trunk members of the plurality of trunk members, wherein said frame has a cross-like shape defined by two elongated beams, wherein a first central portion of one of the two elongated beams is perpendicularly attached to a second central portion of a second of the two elongated beams.

2. The plant-shaped solar energy collector of claim 1 wherein said frame has wheels, wherein the wheels are located on distal ends of the beams of the frame.

3. The plant-shaped solar energy collector of claim 1, wherein said tree assembly has the shape of a tree.

4. The plant-shaped solar energy collector of claim 2, wherein the wheels are wheels with a locking mechanism.

5. The plant-shaped solar energy collector of claim 1, wherein the solar cell embedded in each leaf member of the plurality of leaf members is a single sided solar cell.

6. The plant-shaped solar energy collector of claim 1, wherein the solar cell embedded in each leaf member of the plurality of leaf members is a double sided solar cell.

7. The plant-shaped solar energy collector of claim 1, wherein said base is a foundation base providing support and stability to the tree assembly.

8. A plant-shaped solar energy collector, consisting of:

a) a tree assembly including cables, a plurality of trunk members, a plurality of branch members, and a plurality of twig members, wherein trunk members of the plurality of trunk members are electrically and removably connected to each other, said plurality of branch members are electrically and removably connected to the plurality of trunk members, said plurality of twig members are electrically and removably connected to said plurality of branch members, wherein said cables are attached to the plurality of trunk members, said cables are tensed and secure to anchors located on a ground surface, wherein the plurality of trunk members have plugs disposed around a surface thereof, said plurality of branch members include plugs disposed around a surface thereon, wherein each of the plurality of branch members include a first socket to modularly connect to one of the plugs of the plurality of trunk members, wherein each of the plurality of twigs include a second socket to modularly connect to one of the plugs of the branch members, the tree assembly is modular and capable of being configured to a desired width and height;

b) a solar cell assembly including a plurality of leaf members, each leaf member of the plurality of leaf members having a rear side and a front side with a solar cell embedded therein, said plurality of leaf members are removably connected to the plurality of twig members, wherein each leaf member of the plurality of leaf members has a third socket to be connected to one of the plugs of the plurality of trunk members;

c) a caster assembly including a frame with wheels, wherein said frame is attached to a tree bottom portion of one of the trunk members of the plurality of trunk members, said frame has a cross-like shape defined by two elongated beams, wherein a first central portion of one of the two elongated beams is perpendicularly attached to a second central portion of a second of the two elongated beams, said frame has a hole to receive one of the plurality of trunk members, the wheels are located on distal ends of the beams of the frame, said wheels are wheels with a locking mechanism; and d) an electric assembly including a charger controller and batteries, wherein the charger controller is electrically connected to the solar cell assembly receiving electric energy from each solar cell of a respective leaf member of the plurality of leaf members, wherein the charger controller charges the batteries, said electric assembly further includes an inverter to transform a direct electrical current provided by the solar cell assembly into alternating electrical current.

9. The plant-shaped solar energy collector set forth in claim 1, wherein the solar cell assembly has a shape of a fruit.

* * * * *